United States Patent [19]

Andersson et al.

[11] 4,322,793

[45] Mar. 30, 1982

[54] COMMUNICATION CONTROLLER TRANSPARENTLY INTEGRATED INTO A HOST CPU

[75] Inventors: Kurt-Inge Andersson; Victor Gjerstad; Karl G. Gohl, all of Sverige; Lars Hallberg, Sollentuna; Bertil Norstedt, Lidingo, all of Sweden; Helmut Schaal, Lustnau, Fed. Rep. of Germany

[73] Assignee: International Business Machines Corp., Armonk, N.Y.

[21] Appl. No.: 107,465

[22] Filed: Dec. 26, 1979

[30] Foreign Application Priority Data

Jan. 2, 1979 [SE] Sweden .............................. 7900021

[51] Int. Cl.³ ............................. G06F 9/22; G06F 3/04
[52] U.S. Cl. .................................................. 364/200
[58] Field of Search ... 364/200 MS File, 900 MS File

[56] References Cited

U.S. PATENT DOCUMENTS 3,842,405 10/1974 Key et al. ........................... 364/200
4,159,518 6/1979 Draper et al. ..................... 364/200

Primary Examiner—Raulfe B. Zache
Attorney, Agent, or Firm—Gerald R. Woods

[57] ABSTRACT

Communication control functions are performed by an integrated adapter implemented as microcode resident in host CPU storage. The integrated adapter shares a common high speed bus with other CPU facilities. A high speed bus adapter provides an interface between the common high speed bus and low speed line adapters. Communication controlling commands and register structures are described.

12 Claims, 4 Drawing Figures

4,322,793

COMMUNICATION CONTROLLER TRANSPARENTLY INTEGRATED INTO A HOST CPU

TECHNICAL FIELD

The invention relates to a communication controller in a data processing system for controlling communication lines.

BACKGROUND ART

In the past, communication controllers have been incorporated into data processing systems at a subsystem level, where they have had to have their own separate processors, or have required a dedicated direct communications line. One example of such a communication controller is described in U.S. Pat. No. 3,842,405, the subject matter of which is incorporated herein by reference.

In this patent the communication controller serving the various communication lines includes a microcontrol memory, an arithmetic-logic unit and a number of hardware registers. This controller is connected to the central processing unit (CPU) by means of an input/output channel.

One problem of prior art communication controllers is that they tend to be complicated and expensive. This is especially the case if the controller has to serve a large number of communication lines having different speeds and transmission characteristics.

DISCLOSURE OF INVENTION

The present invention provides a solution of these problems by transparently integrating the entire communication controller into the host CPU. This is achieved by placing the controlling communication microcode in the ordinary control store of the host CPU, sharing a high speed channel with other input/output units independent of type (disc file, tape file) for signal communication between the controller part of the CPU and the various communication line adapters (low speed line adapters). A high speed bus adapter is provided as an interface between the high speed channel and the low speed line adapters.

One further advantage of the present invention is that the high speed bus adapter provides an interface which simulates the operation of an ordinary communication controller. Ordinary low speed adapters can be used without modification.

A further description of the solution of the problems in prior art systems is given in the attached claims.

BRIEF DESCRIPTION OF THE DRAWINGS

The invention will now be described in accordance with the following figures.

BEST MODE FOR CARRYING OUT THE INVENTION

In the following description, the same terminology is used as in literature for communication and data processing, see for instance "IBM System/370 Model 135 Terminal Adapter Type I Model II for ICA, form number GA33-3007" and "IBM Synchronous Data Link Control, General Information, form number GA27-3093".

Figure 1:
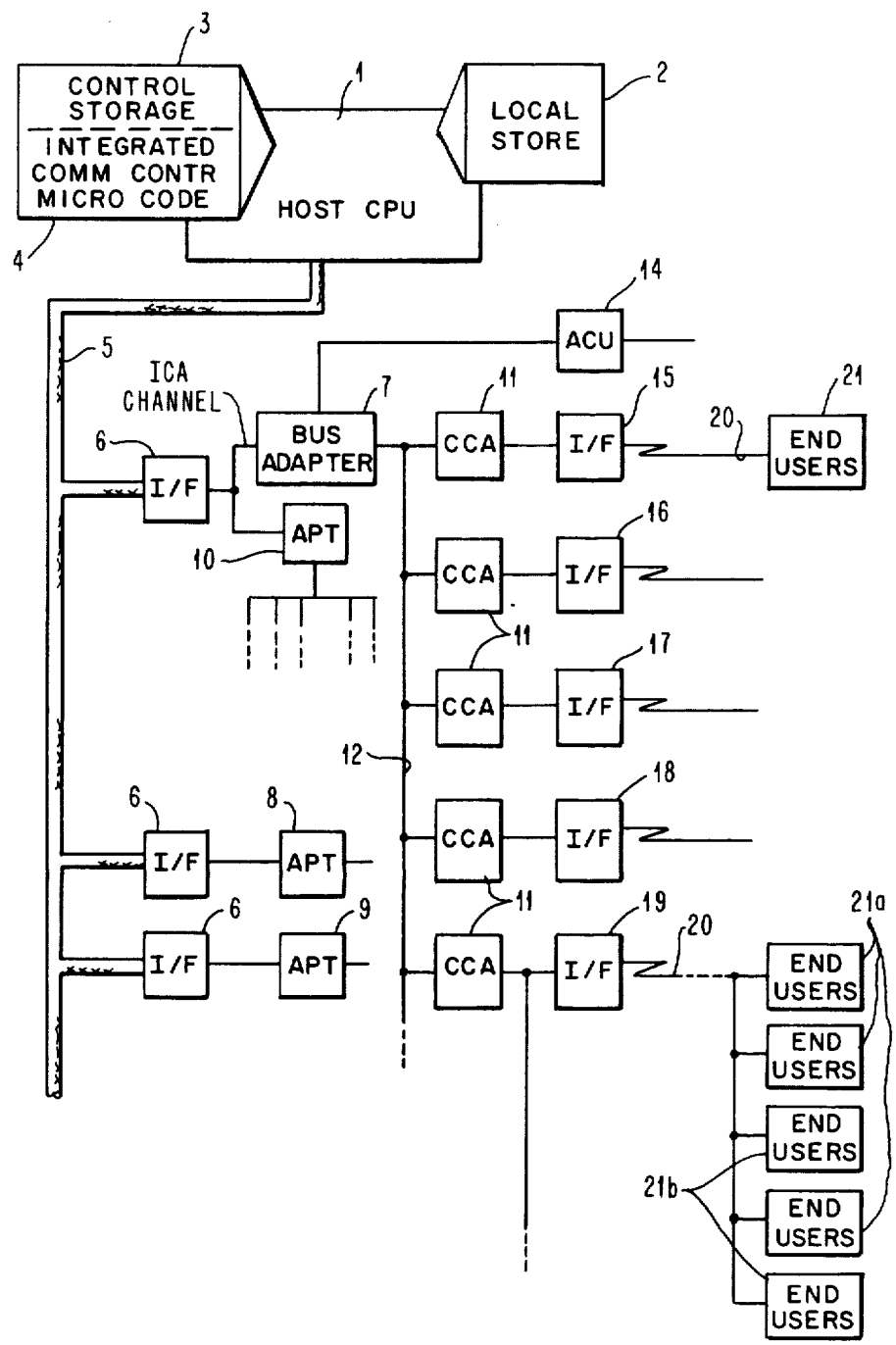
FIG. 1 is a block diagram of a communication controller system according to the present invention.

FIG. 1 shows a Communication Controller organized as an Integrated Communications Adapter (ICA) in a data processing system having a host processing unit 1, with a local store 2, control storage 3 and a high speed integrated ring loop bus 5. High speed integrated bus 5 is connected to a plurality of types of adapters 7–10 via adapter interfaces 6. The adapters 7–10 connected to the interfaces can be specialized adapters such as for disk or tape files; or they can be standard block or byte multiplex channel adapters. Adapter 7, in accordance with the present invention, is an integrated communications Bus Adapter (BA) and connects a low speed programmable I/O bus 12 (PIO-bus) to the data processing system's main speed integrated channel bus 5 via interface 6. Low-speed PIO-bus 12 is connected to a plurality of Common Communications Adapters (CCA) 11 which in turn are respectively connected to line interfaces 15–19 for varying types of communication lines 20, serving a number of end users 21. Bus adapter 7 can in addition be connected to Automatic Calling Unit (ACU) interface 14.

The ICA Bus Adapter (BA) 7 provides a link between the various communications line facilities (such as 11 and 14) and a transparent Integrated Communications Controller (ICC) 4 inherent in the host data processing system's CPU 1. A set of control and sense instructions, in addition to trapping functions, control communications between front-end hardware and the communications microcode residing in the CPU. The trapping mechanism provides for processing trap requests according to their priority, i.e., in accordance with the "level" of the trap request. A trap request forces control to be transferred to a particular module in the host system microcode control store. A trap occurs for each character being transmitted or received. Furthermore, the ICA Bus adapter 7 has a number of functions built into it in order to keep the interference with the CPU for I/O instructions on the PIO-bus down to a minimum. The following functions are performed by the Bus Adapter without assistance from the Integrated Communication Controller in the CPU 1:

(1) Interrupt recognition on the PIO-bus
(2) Interrupt priority selection
(3) Translation of interrupt levels into adapter addresses
(4) Reading of line adapter basic status
(5) Analysis of basic status
(6) Reading a data byte from line adapters
(7) Writing a data byte to line adapters
(8) Executing microcode initialized by PIO-instruction.

The ICA Integrated Communications Controller

Figure 2:
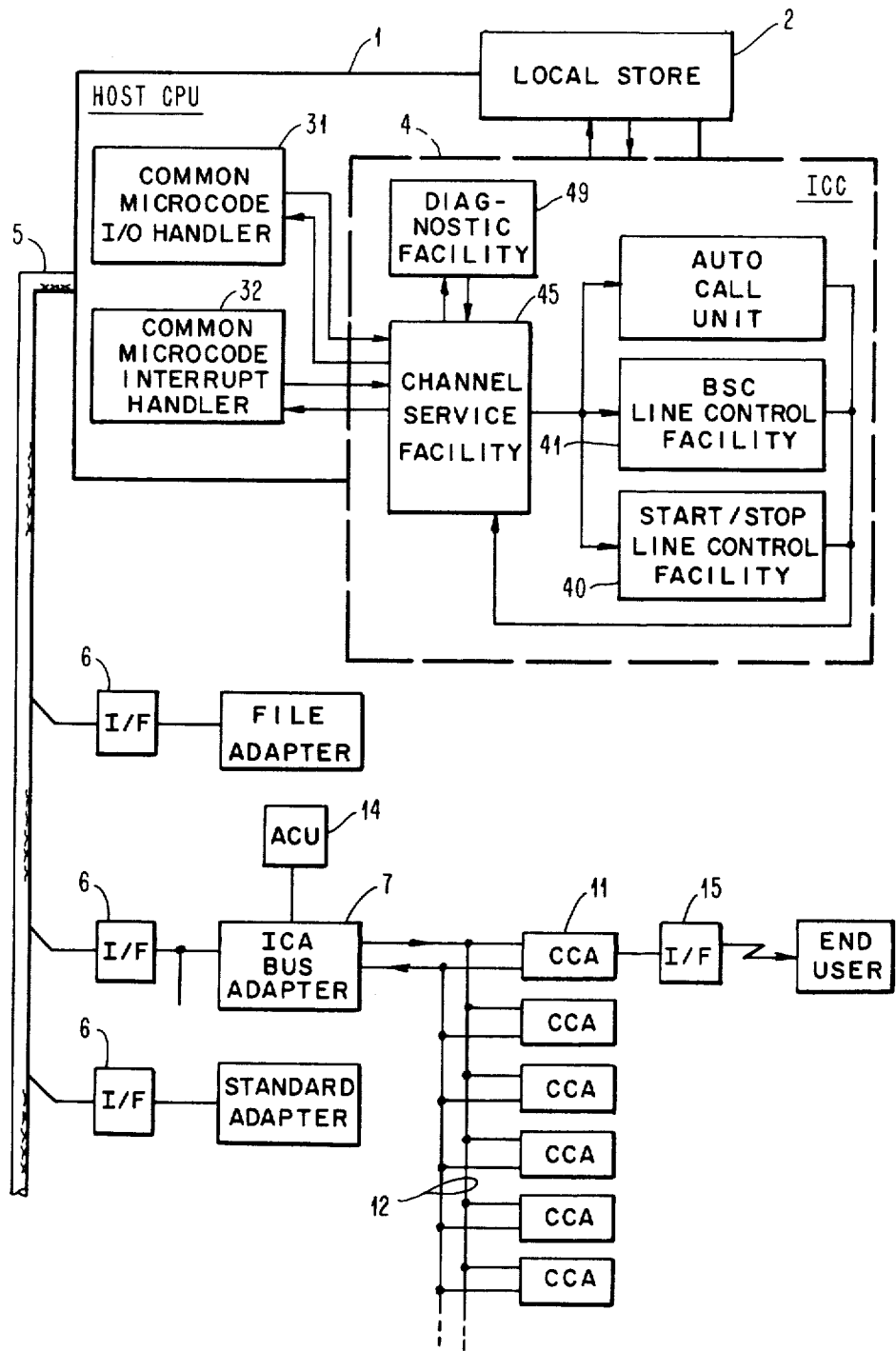
FIG. 2 is a block diagram showing a number of control storages in a basic system according to the present invention.
Figure 3:
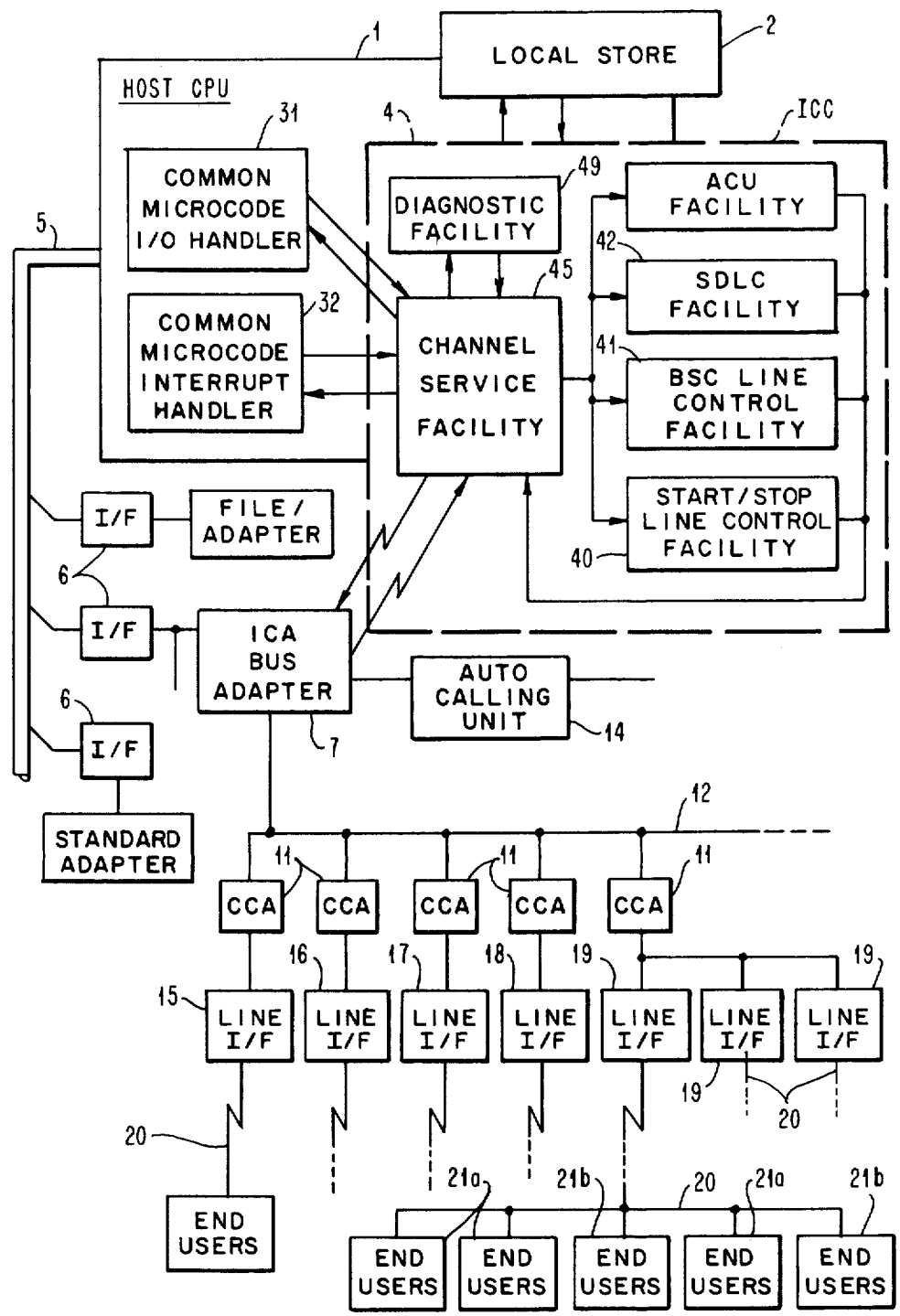
FIG. 3 is a block diagram showing an extended system as compared to the system in FIG. 2.

The Integrated Communications Controller (ICC) 4 is an integrated part of the host CPU 1, utilizing the same CPU interrupt 32 and I/O instruction interpreter 31 microcode facilities as other functions in host system, but having in addition, four modules: a Channel Service Facility 45, a Synchronous Data Link Control Facility 42, a Binary Synchronous Line Control Facility 41 and a Start/Stop Line Control Facility 40 dedicated to the Integrated Communications Adapter (ICA). FIG. 2 shows the basic ICC Interface and FIG. 3 shows the ICC with the Synchronous Data Link Facility.

The ICC consists of microcode residing in CPU control storage. When hardware generates traps, the various ICA-dedicated facilities in the CPU are engaged accordingly. The ICC facilities use the host system's common integrated channel sense and control facility for data transfer to and from the ICA Bus Adapter interface.

The vital information for each subchannel, i.e., teleprocessing line, is maintained in a respective 32 byte Unit Control Word (UCW) in the local store. In addition, a portion of main storage is reserved for ICC to use as UCW-extension fields containing additional information for Synchronous Data Link Control (SDLC) operations, an in-line test area, a command decode and translate table, a character decode and translate table, and a trace area.

The local store also contains a number of ICC functions and work registers such as for trace, dynamic display and log functions, and an adapter work area. It is in the adapter work area 33 that adapter and channel addresses are located as well as the BA's operational control register and registers for SDLC functions.

The UCW contains diagnostic flags used to control trace, dynamic display, and diagnostic and testing functions. These flags are entirely controlled by ICC mocrocode. When diagnostic or testing functions are active, the associated subchannel will appear busy to the system. If a Start I/O command is issued, the initiated status will indicate busy. A secondary interrupt is generated upon termination of the function to change the unit status to Device End. The online diagnostic tests, which test one line interface concurrently with normal operation on the other lines, tests the hardware in SDLC operations as well.

The UCW also contains a Command Code and a flag for the Transfer in Channel (TIC) command. The basic commands are:
NOP
SADX
Sense
Set Mode (for Binary Synchronous Control and Synchronous Data Link Control only)
Dial
Enable
Disable
Inhibit (Start/Stop only)
Prepare
Poll
Break (Start/Stop only)
Read
Write It also indicates when there is no command active. The Inhibit, Prepare, Poll, Break, Read and Write commands require the line to be enabled before execution.

For SDLC operation the commands are:
Write
Read
No-operation
Sense
Write-PIU
Read-PIU
Transfer-in-channel
Autopoll
Control-SCB
Poll
Sense-SCB
Contactpoll
Set-mode
Enable
Dial
Disable The Control-SCB, Autopoll, Sense-SCB, Contactpoll, Read, Write, Read-PIU, Write-PIU, and POLL commands require the line to be enabled before execution.

The UCW for each line includes indicators for:
not operable: (line not installed)
subchannel working: (a SIO command was successful and no interrupt has been enqueued)
primary interrupt pending: (an ending status is available on the system)
logout pending It further contains the addresses for the ICA Bus Adapter, the ICA channel, each of its devices, along with a sense byte indicating:
command rejected
intervention required
equipment check
data check
overrun
lost data, and
timeout;
as well as unit and channel status words, the mode byte, feature fields describing BSC, SDLC or S/S line control, an error code field which can be used as a second sense byte, a modem control field and S/S, SDLC or BSC feature control fields.

The ICA Bus Adapter

The ICA Bus Adapter (BA) 7 serves as an interface between the low speed PIO-Bus and the high speed integrated channel bus. The function is to support the PIO-bus 12, to provide for attachment of the CCA, and thereby provide a link to the ICA microcode (ICC) in the host CPU via traps, and sense- and control commands. Communications can be initiated via adapter interrupts as well as via ICC initiated requests. The ICC controls the BA only by sense and control commands. The timing is defined by the Integrated Channel Bus clocking and the host CPU instruction time. The BA Sense and Control Registers are summarized in Table 1.

TABLE 1

| Bus Adapter Sense/Control Registers Byte | |
|---|---|
| CONTROL | SENSE |
| 0 BA-OP Reg | BA-OP Reg |
| Bit-functions: | Bit-functions: |
| Adapter enable (1) | Adapter enable (1) |
| Interval Timer enable | Interval Timer enable |
| Address ext. Enable | Address Ext. |

TABLE 1-continued

| Bus Adapter Sense/Control Registers Byte | |
|---|---|
| CONTROL | SENSE |
|  | Enable |
| Clock Stop Override | Clock Stop Override |
| Trap Req Demand, TRD | Trap Req Demand, TRD |
| Micro CTL Mode | Micro CTL Mode |
| High Speed Mode | High Speed Mode |
| 1 PIO Bus-In/Data Register: | PIO Bus Sense Reg: |
| PIO-Data | PIO-Address, -Command, Data |
| 2 Address Register: | BA-Status Register: |
| Bit-functions: | Bit-functions: |
| PIO-Addrs. range | Check Trap |
| (Address Extension) | Coded Trap Requests: |
| PIO-Address | TRD Trap |
|  | PIO Ins. Complet. Trap |
|  | Normal Input Trap |
|  | Normal Output Trap |
|  | B-Status Avail. Trap |
|  | (Address Extension) |
|  | PIO-Address |
| 3 Command Register: | BA-Sense Register: |
| PIO-Commands | Bit-functions: |
|  | SMS-Bus Check |
|  | IRM Operation |
|  | Read Command |
|  | ACU Trap |
|  | Interval Timer Trap |
|  | IC Trap Request |
|  | PIO-Bus Parity Check |
|  | Tag Timeout |
| 4 Diagnostic Control Register | Diagnostic Sense Register |
| Bit-functions: | Bit-functions: |
| Diag. Tag-out: IO, | Tag-out IO, TA, |
| RA, TC, TD | TC, TD |
| Diag. Tag-in: IRR, | Tag-out IRR, |
| PV, Valid | PV, Valid |
| Diag. Mode | Mode |
| 5 BA-Control Register | BA-Control Register |
| Bit-functions: | Bit-functions: |
| Force SNS-Bus active | Force SNS-Bus active |
| Force PIO-Bus active, | Force PIO-Bus active |
| Disable ACU Trap, | Disable ACU Trap |
| Disable NIR/NOR decode, | Disable NIR/NOR dec. |
| Disable Tag timeout, | Disable Tag timeout |
| Diag gate, | Diag gate |
| PIO-Halt, | PIO-Halt |
| PIO-Reset, | PIO-Reset |
| 6 ACU-Control Register | ACU-Control Register |
| 7 Miscell. Control | ACU-Sense Register |
| Bit-functions: |  |
| BA-Reset FL ON, |  |
| BA-Single Cycle, |  |
| BA-Check Reset/RA RST FL OFF |  |
| 8 High Speed Data Reg: | BA Logic SNS Register |
| PIO-Transmit Data | Bit-function: |
|  | Address Time |
|  | Command Time |
|  | Data Time |
|  | Hi Speed Data Time |
|  | Idle State |
|  | First IOI |
|  | Second IOI Prepare |
|  | Normal Input Req. |

The BA OP-REG consists of polarity hold latches with glitchless set function. The register can only be altered by microcode and sensed back direct. The "Adapter Enabled" bit, when on, brings the BA into the idle state from which all normal functions are started. When off, it puts the BA in a state where it does not react to any activity on the PIO BUS. Trap requests are degated. For testing of the PIO BUS, the off condition is used to keep the BA hardware inactive and allow the microcode to have complete control over all activity on that bus. The "Interval Timer Enable" bit, when on, enables interval timer traps. When off, it does not allow any interval timer trap to occur. This bit also resets any interval timer trap condition which may be present. The "Address Extension Enable" bit, when off, allows the BA to only address adapters on the PIO Bus in address range 0-7 during Interrupt Response Mode (IRM). When on, it extends the address capability to a maximum of 16 addressable adapters. Two adapters then share an interrupt level. The "Clock Stop Override" bit, when off, provides for BA-Clock Stop in case of check conditions detected by the BA (PIO-BUS Parity, Tag Time Out, Sense Bus Check, Common BUS Check) or in DIAGNOSTIC (DIAG.) mode. When on, it allows the BA-Clock to keep running, e.g., during debugging and tests. The "TRD" (Trap Request Demand) bit, when on, will generate a trap condition whenever the BA is in the idle state and no PIO-Bus interrupt is present. When off, it will reset the TRD trap condition. TRD is used to allow the microcode to synchronize its operation with the BA.

The "MCM" (Microcode Control Mode) bit, when on, forces the BA to operate as a slave of the ICC and therefore only perform PIO instructions which are initialized by microcode. In MCM the BA will raise a "PIO instruction completed trap" to the host CPU at the end of each PIO instruction performed. In Microcode Control Mode, ACU traps and Interval timer traps are degated, TRD trap is reset.

The High Speed Mode bit, when on, will change the normal mode of operation of the BA in the following way: Whenever an interrupt on level 0 is detected, the high speed interrupt latch in the BA will be set. If the interrupt was a request for output data, the BA will not trap the ICC after reading the B-Status but send out the data byte which is stored in the high speed data register. After execution of the write data instruction, the ICC will be trapped in order to provide the next data byte to be stored into the high speed data register. The trapping technique provides one byte extra buffering for the high speed line, to avoid the underrun condition in the CCA of that line.

The PIO BUS IN/Data Register consists of polarity hold latches which can be altered by microcode as well as through BA hardware. (No direct sense capability.) The register is used for two different purposes: (1) As the PIO Bus-In Register, when the BA hardware gates the PIO-BUS IN information into that register. In idle state the register is used to detect any PIO-BUS interrupt. In interrupt response mode the register is used to store basic-status information (B-stat) or data bytes dependent on the type of read instruction being performed by the BA. In MCM the register is also used to store the read information to make it available to the microcode via sense instruction. (2) As a "Data Register" for all write type instructions on the PIO-Bus. The register contains the data to be transferred to the PIO-BUS attached adapter, except for high speed write operations. The register cannot be altered by microcode if a check trap is pending.

The Address Register consists of polarity hold latches which can be altered by microcode as well as through BA-hardware. (No direct sense capability). The register is used to hold the address of the PIO bus attached adapter which will be addressed either during IRM or in MCM. In IRM the BA generates an address out of the interrupt which was picked as the one having the highest priority. This address is then used during the entire communication with that adapter. In MCM the microcode can alter the address register to address any of the PIO-bus attached adapters. The contents of the address register are provided for sensing in the BA-Status register. The register cannot be altered by microcode if a check trap is pending.

The command register consists of polarity hold latches which can only be altered by microcode. (No direct sense capability). This register is used to hold the command byte of a PIO-instruction to be performed under microcode control. The commands in IRM are not stored in the command register. They are forced onto PIO-Bus-out at the right point in time. The register cannot be altered if a check trap is pending.

The high speed data register consists of polarity hold latches which can only be altered by microcode. (There is no direct sense capability). The register is used to hold the data bytes to be sent to the CCA interrupting on level 0 for outbound data transfer. However, the high speed mode bit in BA OP REGISTER must be on to perform that function. The register cannot be altered when a check trap is pending. The PIO-Bus Sense Register provides sense information to the microcode. It is used as common sense register for each of the preceding four registers described. However, since the BA hardware after termination of a PIO instruction is always gating the Bus In/Data Register to the PIO-BUS out, the microcode finds the byte read or written displayed in that register. In IRM this would be either the B-Stat contents or the data byte read. In MCM, the data byte read or written will be found in that register. In diagnostic mode, however, since the BA hardware control can be stepped in single cycle, all four registers can be made available to the microcode via this common sense register. The BA Status Register provides sense information about the Bus Adapter-Status to the microcode. The "Check Trap" bit, when on, generates a trap request. It can be on due to the following error conditions: Sense bus check/common bus check, PIO-bus parity check, or Tag timeout. When the check trap bit is on, the following registers will not be altered by control instructions issued to them: "PIO-Bus in/data reg", "Address reg", "Command reg" and "High speed data reg". The "Diagnostic sense register" is frozen as soon as the check trap comes up.

The TRD trap is activated whenever the TRD bit in BA-OP-Reg is on, the BA is in idle state, and no interrupt is pending. The TRD trap is reset when either the MCM bit is turned on or the TRD bit in the BA-OP register is reset.

The "PIO-Instruction" trap is activated in MCM whenever a PIO-instruction is completed. It is deactivated if MCM is turned off or when the Command register is altered.

The "Normal Trap" is activated in IRM after the BA has read the B-STAT as well as the data byte of the interrupting PIO-Bus adapter. The data byte is available to the microcode in the PIO Sense register. The trap is degated whenever MCM is on (trap is cut off but not reset). The trap is deactivated (reset) when a sense instruction is issued to PIO Bus Sense register or when a control instruction is issued to the Bus in/Data register.

The "Normal Output" is activated in IRM after the BA has read the B-stat of the interrupting PIO-Bus adapter. The Basic-Status is available to the microcode in the PIO-Bus Sense register. In case of a high speed line interrupt for output data, the normal output trap is activated when the BA has read the B-Stat and sent out the data byte from the high speed data register. The trap is degated whenever MCM is on. It is deactivated (reset) when a sense instruction is issued to PIO Bus Sense Register or when a control instruction is issued to Bus in/Data register.

The "B-Status Available" trap is activated in IRM after the BA has read the B-Stat of the interrupting PIO-Bus adapter and the B-Stat was found to be exceptional. (Neither Normal input- nor Normal output requested). The B-Status is available to the ICC in the PIO-Bus Sense register. The trap is degated whenever MCM is on. The "B-status available" trap is deactivated (reset) by microcode under the following conditions:

Sense instruction to PIO-Bus Sense register
Control instruction to Bus in/Data register
Control instruction to High speed data register Control instruction to Command register The ICC has to switch the ICA-BA to MCM and perform a PIO-instruction by loading the command register.

The "PIO Address" represents the address of the PIO-Bus adapter with which the BA was in operation before the trap condition occurred. These bits are a direct copy of the Address register bits.

The BA Sense Register provides sense information about BA detected error conditions and other trap and status indications.

The "Sense Bus Check" bit on, indicates that an error condition on the BA-Sense bus was detected. The Sense bus is permanently monitored for any bit on the bus during all times when the sense bus should be empty, such as when the host CPU performs a Sense instruction to any IC-Bus attached adapter other than the BA, or when no Sense instruction is performed. In many cases the check bit will come up together with the "Common bus check" on the Adapter Interface 6. A check trap will be signaled to the microcode when either the BA has detected a Sense bus check or the Adapter Interface has found a Common bus check condition. The sense bus check latch is reset with "BA check reset".

The "IRM Operation" bit, and the "Read Command" bit are for diagnostic routines.

The "ICA Timer Trap" bit indicates that an ICA timer trap condition exists. The trap condition can be reset by switching the BA-OP-Register X'4' bit 1 off. To enable further Interval time traps the bit 1 must be turned on again. The timer works asychronously, i.e., the first trap occurs 0 to 13 ms after the timer was enabled. Thereafter, timer traps will occur every 13 ms.

The "IC-Trap Request" is for diagnostic routines. If the functional microcode has detected a condition where the Diagnostic Facility should take over control, the ICC can switch off the IC-trap request signal going to the host CPU by turning on the DIAG GATE bit in Reg X'9'. A test program can then exercise the BA-hardware without causing traps to the host CPU but still be able to monitor trap conditions by sensing this bit.

The PIO-Bus Parity Check bit: The data flow between the BA and the PIO-BUS adapters is controlled by parity bits in all information bytes transferred. All four registers involved are equipped with a parity bit. Whenever registers are gated out to the PIO-bus, the parity bit is compared with a newly generated one. The same is done for read type PIO-Instructions during the data transfer time. The byte transferred via the PIO-In bus is checked for good parity. If parity valid (PV) is signalled by the PIO attached adapter, the check condition is reset with "BA check reset".

The "Tag Timeout" bit indicates a PIO bus Tag timeout condition which occurred in connection with a PIO instruction after a count period of 6 microseconds. The following conditions are controlled by this 6 microsecond Tag timeout: (1) the Time when no out-tag is active until "valid" is deactivated. ("IO Tag" must be active); (2) the Time when any out-tag is active, until "valid" becomes active ("IO Tag" must be active); and (3) the Time when "IO Tag" is deactivated, until IRR turns inactive.

The DIAG Control Register consists of polarity hold latches with glitchless set function. The register can only be altered by microcode. The DIAG Control Register supports the following functions:

(1) In order to test the internal hardware of the BA, incoming PIO-Tag lines (Valid, PV, IRR) from the BA-hardware control have to be degated. Tag line degating occurs by turning DIAG mode bit on. In this mode, the microcode has control over all three PIO Tag in lines and can thus monitor and control the BA hardware as desired.

(2) To test the PIO-Bus and the attached adapters under control of microcode the DIAG Control Register provides microcode access to all four PIO-Tag outs. (IO, TA, TC, TD). When the BA is in a disabled state, the hardware control is degated and the microcode can take over control of the PIO-BUS. The Diag. Bit mist be off in this case. The Command Register is used to hold the ADDR-, CMD-, DATA bytes to be transferred over the PIO-Bus.

The PIO-Bus Sense register is used to read data from PIO-BUs in.

The DIAG Sense Register provides sense information over PIO tag-in and tag-out during the various levels of testing and diagnostics. In Diag mode the PIO tag-in lines are degated from the sense register. Only a copy of bits 4-7 of the DIAG control register can be sensed on bits 4-7. Bits 0-3 however, display the actual status of the PIO tag-out lines as controlled by BA-hardware. When not in Diag mode, the PIO tag-in lines are displayed as they are on the PIO-bus. When the BA is in the disabled state, bits 0-3 are a copy of bits 0-3 of the DIAG Control register. The DIAG Sense register is frozen when a check trap condition exists.

The BA-Control Register consists of polarity hold latches with glitchless set function. The register can only be altered by microcode. The BA Control Register provides for various options used in test routines or special BA applications. It can be sensed back direct.

The BA has circuits to monitor its sense bus for error conditions. In order to test the checking hardware, the "Force Sense Bus Active" is turned on to force a sense bus check.

The PIO-Data buses are controlled by Parity checking circuits in the BA as well as in the PIO-Bus attached adapters. In order to check this circuitry, a parity check can be forced by turning that "Force PIO Bus Active" bit on.

The "Disable ACU Trap" bit, when on, inhibits all ACU trap conditions to be signalled to the PU. The "Disable NIR/NOR Decode" bit, when on, will put the BA into a mode of operation where it will not decode the Basic status of a PIO-bus attached adapter but instead will trap the ICC immediately after reading the Basic status from an interrupting adapter.

The "Disable Tag Time Out" bit is used to disable possible Tag timeouts and will be used for BA diagnostics. The "Diag Gate" bit is only used when testing the PIO-bus, etc. It allows test routines to select either the Command Register output or the PIO-Bus in/Data Register output to be gated to the PIO-Bus Out. At the same time the information is also available to the microcode via the PIO bus Sense Register. When on, it will also degate the IC-trap requests signal going to the host CPU.

By having the "BA-Reset FL on" bit in the Miscellaneous Control byte on in a control instruction, a latch in the BA will be set which resets all BA Registers as well as the Control hardware.

The BA hardware is normally clocked by a signal from the Adapter Interface 6. This clock signal will be degated from the BA hardware in Diag. mode. Performing a control with the "BA Single Cycle" bit in the Miscellaneous Control byte on allows hardware to step into a single cycle mode of operation.

The ICA Bus Adapter has three modes of operation: Idle State, Interrupt Response Mode and Microcode Slave Mode. The Idle state is left either when returning to the disabled state or when one of the following events occurs:

1. An interrupt is detected on the PIO Bus. When this occurs, the BA leaves the Idle State and enters Interrupt Response Mode. It is during the Interrupt Response Mode that the BA answers the interrupt and completes all necessary communication with the interrupting line adapter (CCA) and the ICC.
2. The ICC sets the "trap request/demand" bit in the Bus Adapter Control/Sense Register. When this occurs and no interrupt is present on the PIO-bus, the BA forces a trap allowing the ICC to synchronize its operation with the BA.
3. The ICC sets the "Microcode Control Mode" bit in the BA control/sense register. When this occurs, the BA will not accept interrupts on the PIO-Bus, as it must operate under ICC microcode control only. Only those PIO instructions initiated by microcode will be served.

As shown in FIGS. 2 and 3, the ICA Bus Adapter 7 interfaces via the PIO-Bus 12, which has a full byte of adapter address space, to the CCA (11), which recognizes a plurality of different addresses. The BA, however, supports 8 different CCA addresses on the PIO-Bus, of which two are spare addresses and can furthermore be extended to allow a plurality of additional addresses.

The BA interfaces with the high speed Integrated Channel Bus via adapter card 6. For signals such as "IC-Trap request", however, the interface is directly with the host CPU. The Bus 5, is capable of attaching a plurality of adapters, e.g., adapter card interface 6. Each adapter 6 has an address space of 32 addresses for sense and control commands. Twelve of these addresses are for the Channel Adapter, e.g., 10; eight are for the Adapter Interface 6; and twelve are for the ICA Bus Adapter 7.

ICA-Bus Adapter Trap Conditions

The BA trap conditions are each indicated individually in the BA Status and Sense Register. The trap conditions will be present until the microcode (i.e., ICC) has reacted to the cause of the trap. If different traps are up at the same time and the microcode only reacts to one of them, the others will remain on. Check traps are, however, reset together with "BA check reset".

There is no trap request latch. All trap conditions are ORed to generate the "IC-trap request". No trap will be signalled to the host CPU when the adapter is not enabled or when the "Adapter degate" flag is on the Adapter Interface 6 or when "Diag gate" is on. A primary input to the BA is provided to allow for the ORing of trap requests onto one and the same trap level.

ICA-BA Interrupt Priority

The BA allows interrupts on all levels of the PIO-bus. If several interrupts at different levels are active at the time when the BA accepts one, an interrupt priority logic ensures that the one with the highest priority is handled first. A high speed line must be wired to the highest interrupt level (0).

The ICA Channel Service Facility

As previously stated, the ICC in the CPU has four ICA-dedicated features, one of which is the Channel Service Facility (CSF) 45. The I/O Channel instructions are used to initiate operations or to test the status of the line attachment: Start I/O, Start I/O Fast Release, Halt I/O, Test I/O or Clear I/O.

Access to a specific communication line is accomplished via the subchannel assigned to the line on the ICA channel. The Test Channel instruction is executed by the host CPU's Instruction Interpretor without activating the ICA. The instruction requests the operating status of the ICA channel. Prior to the ICA specific facilities gaining control, the CPU's common I/O handler 31 has checked the validity of the channel command word (CCW) and has located the program control word (PCW) area.

The Start I/O instruction initiates all ICA I/O commands. It causes the valid channel control word (CCW) to be fetched and the UCW to be initialized. A level trap for service is set for the line in the Bus Adapter Work Area. If no line service request is pending, this zero level trap will be served and the appropriate line controller's command initiation handler will receive control.

The Start I/O Fast Release instruction is executed as a Start I/O instruction.

The Test I/O instruction determines the status of the addressed line. If the addressed line has an interrupt pending, the channel status word will be stored and the pending interrupt condition will be cleared.

The Halt I/O instruction terminates any active command for the addressed line. If the line has pending interrupts or is idle, no action is taken.

The Halt Device instruction is executed as a Halt I/O instruction.

The Clear I/O instruction discontinues any ongoing operation on the addressed line and stores the status. Pending interrupts are cleared and the subchannel is made available.

Figure 4:
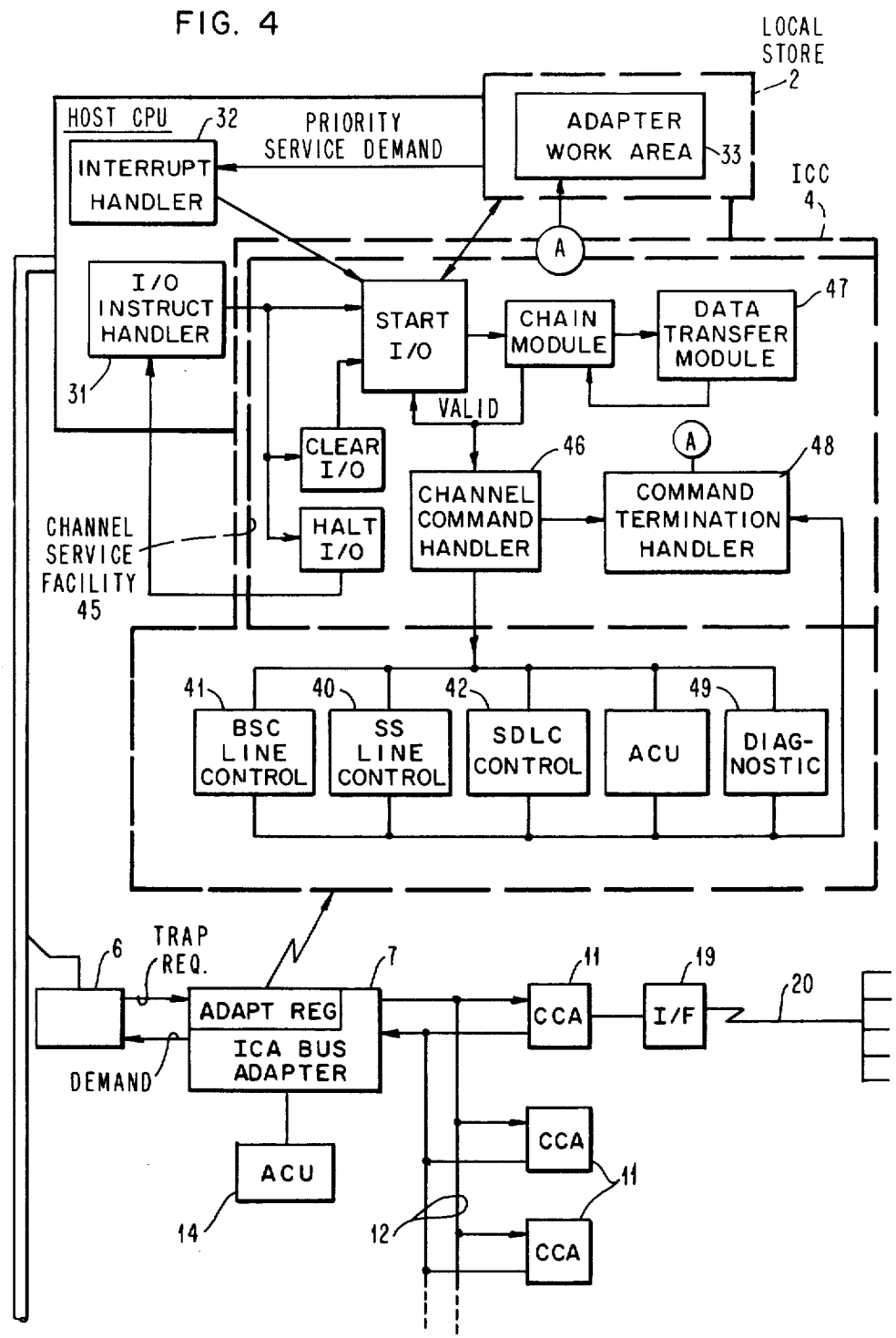
FIG. 4 is another block diagram showing some details of the communication controller according to the invention.

FIG. 4 shows the Channel Service Facility 45 interfaced with the host CPU microcode and with other ICC constituents. Primary interrupts result in a common interrupt queue and the subchannel status is updated to indicate the pending interrupt. A common interrupt handler 32 in the host system will clear the pending interrupt condition for the type of interrupt.

Secondary interrupts, however, are not cleared automatically by the host system's interrupt handler. In the case of secondary interrupts, control is returned to the ICA microcode for storing the appropriate status.

When a valid Start I/O instruction has been issued, the Channel Service Facility's Channel Command Handler 46 will invoke the appropriate Line Controller by setting up an operational sequence field that controls subsequent actions, and initiating the hardware, depending on the particular command, to generate trap requests. These traps will be processed by the line controller, which will be executed on the highest trap level. Command Chaining is performed by fetching a CCW, checking it, incrementing the CCW address by 8 and initiating the command by transferring control to the Channel Command Handler.

The Channel Service Facility uses the Sense command to transfer two sense bytes, taken from the UCW for the line addressed, to main storage, and uses the Set Mode command to transfer one byte from main storage to the UCW. Data transfer in and out of main storage is accomplished with a data transfer module 47 that is common to the ICC facilities. One byte of data is transferred at a time. If the length count is decremented to zero and "chain data" has been specified, data chaining will be performed before leaving the data transfer module. Chain data is not used for SDLC operations.

Command Termination 48 is another module that is common to the ICC facilities. The Command Termination module terminates the ongoing command. If the length count is not zero, "incorrect length" is set in the channel status. If command chaining is specified and no unit exception condition exists, command chaining is queued for the line. Without command chaining specified, an interrupt is enqueued and the subchannel is left in the interrupt pending state.

When an I/O unit issues for example, a request for service on the PIO Bus, the ICA Bus Adapter makes a trap request via the high speed integrated channel to the ICC in the host CPU. This request is first processed by the host system's common interrupt handler 32 and I/O instruction interpreter 31. The ICA hardware control is performed only on the host CPU's highest trap levels. The Channel Service Facility then initiates the I/O instruction and sets the Bus Adapter Status/Sense register accordingly.

The ICA Start/Stop Line Control Facility

The ICA Start/Stop (S/S) Line Control Facility provides a link between the Channel Service Facility and the function of the Common Communications Adapter (CCA) in controlling asynchronous lines.

As previously stated, in asynchronous line control, the Start/Stop Line Control Facility provides a link to the Common Communications Adapter (CCA) 11 at the front end of ICA. For Start/Stop operations, the CCAs serialize/deserialize a byte, buffer one data byte, control the attached data communications equipment (DCE) and sense DCE conditions, establish transmit and receive bit timing, perform interval timer functions in accordance with the ICC, append Start and Stop bits onto transmitted bytes, test each received byte for a valid Stop bit and for odd parity, remove Start and Stop bits from each byte received, test each byte received for an all zero condition and indicate when a Break sequence is being received, and transmit a continuous zero bit pattern as a Break sequence.

Each CCA has one transmit data, one receive data, and a number of sense and control registers accessible by the asynchronous line controller via the PIO-bus. The CCA is initialized with control commands from the host CPU. The A-Ctrl register is set to specify the data flow direction and the mode being used. The M-Ctrl affects the DCE interface. The CCA timer is set using the two timer registers. The CCA activates an interrupt on the PIO-bus thus requesting service from the ICC under the following circumstances:

(1) a request for a data byte (Transmit), i.e., the normal output request (NOR)
(2) availability of a data byte (Receive), i.e., the normal input request (NIR)
(3) a change of level on the DCE interface or timeout on the CCA timer, which indicates "B-stat is available".

The B-stat register, when an interrupt occurs, contains information about the cause of the interrupt. The A-stat contains supplementary details. The M-stat contains the levels and transitions of the DCE signals. The ICA Bus Adapter, then senses the B-stat information from the CCA, evaluates it and sets the BA-status byte in accordance with the type of interrupt (1-3). It then forces a trap to the Channel Service Facility.

Asynchronous Line Command Handler

The following describes how commands are handled for Start/Stop operations.

(1) For the ENABLE Command, the ICC's asynchronous (S/S) command microcode controls the DCE interface through the CCA by raising the "data terminal ready" condition. It sets a 3 sec. time out for the "data set ready" condition to be activated from the DCE and it checks that "data set ready" actually becomes activated by the DCE. If a permanent "request to send" (RTS) is made and the line is leased, the "request to send" and the DCE-interrupt is disabled and the command is terminated.

(2) For the DISABLE command, the ICC's S/S microcode controls the DCE interface by resetting the modem control (M-Ctrl) in the CCA, and setting a 1 sec. time out. If the line is a leased line, setting asynchronous line indicate to the idle mode and terminating the command. If the line is a switched line, a 25 sec. time out (wait for "data set ready" to fall) is set; the "data set ready" is deactivated; the asynchronous line indicate to set to the idle mode, and the command is terminated.

(3) For the WRITE and AUTOPOLL commands, the ICC's S/S microcode checks when the CCA is receiving something on the line and, if so, sets "unit exception" and a condition code of 1. It then sets the proper sequence in the UCW mode byte. If a "permanent request to send" (permanent RTS), it sets a time out and sets the condition code; otherwise, the "request to send (RTS) is activated on the DCE interface, a 3 sec. time out is set for the "request to send" to come on, and the condition code is set.

(4) For the BREAK command, the S/S facility does the following: the CCA adapter control (A-Ctrl) register Break bits is set and the transmit data line is put into a continuous space condition. A short (approximately 0.78 ms) time out is set and the proper condition code and sequence are set in the UCE mode byte.

(5) For READ and INHIBIT commands, the S/S facilities sets the time out indicator to have a time out that checks for received characters in "Read". For unlimited time between received characters in "Inhibit", the time out indicator is reset. After a positive acknowledgement from a terminal in autopoll, it checks whether the buffer is full. If the receive indicator is on, one or more characters are received without any command being active. It also properly sets the mode, and the condition code.

(6) For the PREPARE command, S/S simply resets the UCW control register, sets the proper sequences and the condition code.

The Start/Stop line control facility also includes "Request"-handling modules that are entered upon an interrupt from one of the front-end communications adapters, i.e., the CCA. When the interrupt is honored by the ICA-bus adapter, a trap is forced. The Channel Service Facility then analyzes the reason for the trap and control is given accordingly to either the normal input (NIR) module, the normal request (NOR) module or the "B-stat available" request mode.

The "B-stat Available" request module is entered when there is a change in the DCE interface signals, an overrun condition, a time out on the CCA timer or a CCA machine check. This S/S module examines the registers of the CCA and performs various checking and control functions when B-stat is in the: idle, transmit, transmit check, transmit end, receive or receive time out state.

TABLE 2

| Sequence | S/S Mode-byte Sequences |
|---|---|
| | Main Functions Requested |
| IDLE | Check for received characters when no command is active. Set the received indicator, if a character was received. |
| READ IBM CTRL | Analyze the received character when S/S is in control mode and set conditions properly. Store the received byte. |
| READ LRC | Compare the received Longitudinal Redundancy Character (LRC) byte with the generated LRC byte and set data check if not equal. Set sequence to READ END monitor for "line quiet". |
| READ IBM DATA | Analyze the received character when S/S is in "data mode" and set conditions accordingly. Store the received byte. |
| READ POLL 1 | Analyze the response from a polled terminal and act accordingly. |
| READ POLL 2 | When channel stop (end of poll list) occurs, terminate the command. Set WRITE POLL sequence. When "perm RTS" is set, pad time out; otherwise set RTP on to DCE interface and set a "long" time out limit. |
| PREPARE | Monitor D character (end of address). |
| READ END | When monitoring "line quiet" and character request", ignore the received character. If not "line quiet" then terminate. |
| WRITE SHIFT REMEMBER | Set sequence to WRITE DATA, save characters already in the character buffer update the LRC. |
| WRITE LRC | Move the accumulated LRC character to the character buffer and reset the LRC register. Set sequence to WRITE PREPARE and transmit the LRC character. |
| WRITE PREPARE END | Reset TSM mode in CCA. If "permanent RTS", set the character time out in order to know when the last character has been transmitted. Otherwise set a character plus two bit times so that the last character is properly transmitted before the RTS is deactivated. |
| WRITE DATA | Analyze the character to be transmitted and set the proper indicators. If shift change, send on the proper shift character instead of the character received from storage and set WRITE SHIFT REMEMBER sequence. Check for good vertical redundancy checking (VRC) parity on the character to be transmitted. |
| BREAK DATA | Ignore the character received from storage and set character indicator to indicate to the B-Stat analysis module that the interrupt is a valid time out. |
| WRITE POLL ADDR 1 | Send address characters to terminal. Save index character |
| WRITE POLL ADDR 2 | (to be used if positive acknowledgement from terminal). Set poll indicator (used by transmit term module to switch over to receive in AUTOPOLL). |
| WRITE POLL INDEX | |
| WRITE POLL INIT | Set C (end of transmission |

TABLE 2-continued

| | S/S Mode-byte Sequences |
|---|---|
| Sequence | Main Functions Requested |
| | characters) to the CCA's transmit buffer; set the CCA to "transmit" mode; and set a 1 sec. time out in order to know when the CCA starts to transmit. |

Binary Synchronous Line Control Facility

The main part of the BSC line protocol is executed by the BSC Line Control Facility (BLCF), which thereby provides a link between the Channel Service Facility and the functions of the CCA in controlling synchronous lines.

For BSC operations, the main functions of the common communications adapter (CCA) are the following:
(1) Serializing/deserializing a byte
(2) Buffering one data byte (receive and transmit)
(3) Controlling the attached DCE and sensing the DCE conditions.
(4) Establishment of transmit and receive bit timing by using either the business machine clock or the DCE timing signals.
(5) Recognition of SYN characters in either EBCDIC or ASCII when not in sync.
(6) Interval timer functions settable by microcode to a variety of times ranging from fractions of milliseconds to a plurality of seconds.

The BLCF has control at the two highest trap levels in the host system. It contains Command Initiation Modules and Request Modules.

Three command initiation handlers are common to all line control operations. These are the ENABLE, DISABLE and DIAL modules that residue in the Channel Service Facility. The SET MODE command is applicable only to BSC and SDLC, but the SET MODE Command handler also resides in the Channel Service Facility. The READ, PREPARE, WRITE, AUTOPOLL, SECOND WRITE command initiation modules reside in the BLCF.

The READ initiation module sets a command remember bit, checks for possible conditions and updates the sense bit. It stores the index byte and the first data byte (if a positive answer to polling in POLL. It also starts a 3 second timer.

The PREPARE initiation module checks whether a receive operation has started for determining how the command initiation should be terminated by the Channel Service Facility.

The WRITE/AUTOPOLL initiation module controls the DCE interface through the CCA by rousing NEW SYNC (when applicable) and sets the CCA in "transmit" mode. It starts a 3 sec. timer; sends an initiated PAD character to the CCA and sets the mode byte in the UCW to "transmit initiate".

The SECOND WRITE initiation module checks for possible error conditions and starts a 1 sec. timer. This command facilitates terminating a transmission with transparent data.

The Binary Synchronous Line Control Facility's request modules are entered when a CCA raises an interrupt caused by (1) the availability of a byte, i.e., Normal Input Request (receive), (2) the request for a byte, i.e., Normal Output Request (transmit), or (3) a status change in the CCA that needs the attention of the line controller, i.e., "B-STAT Available" request.

The ICA-Bus Adapter then fetches the B-STAT from the CCA raising the interrupt, and selects a trap module. The B-STAT supplies the cause of the interrupt which in turn defines the entry point to select the BLCF. The content of the MODE byte finally indicates the appropriate Request Handler, i.e., Normal Input, Normal Output or B-STAT Available. A description of the Request Handlers follows.

Normal Input Requests

There are five true receive modes: Receive Initiate, Receive Normal, Receive End BCC1, Receive End BCC2 and Receive End PAD. In addition, an "Idle" mode is defined as a line that is either disable or is having time-out while waiting for a SECOND WRITE command.

The Normal Input Request Handler monitors for a second SYN to establish character phase, when the mode is "Receive Initiate". For "Receive Normal", it fetches a byte from the CCA (via the ICA-Bus Adapter) and normally stores it in main storage. It checks for channel stop, as well as performs line control functions when control characters are received. It updates the BCC (Block Check Character)/LRC (Longitudinal Redundancy Check) and checks for error conditions. When the mode is "Receive End", it checks the BCC/LRC and terminates the receive operation.

Normal Output Request

There are 14 true output request modes: transmit initiate: PAD2, PAD3, SYN1, SYN2; transmit normal; transmit 1st SYN/DLE fill; transmit 2nd SYN fill; transmit 2nd DLE fill; transmit end; BCC1. BCC2, PAD1, PAD2, terminate 1, and terminate 2.

For "transmit initiate . . . " modes, the Normal Output Request (NOR) Handler sends PADs and two SYNs to start a transmission. When the mode is "transmit normal", it fetches a byte from main storage and sends it to the CCA (via the ICA-Bus Adapter). It checks for channel stop, performs the line control functions called for when control characters are fetched from main storage, and updates the BCC/LRC. The "transmit . . . fill" modes cause SYN/SYN (not transparent text) or DLE/SYN (transparent text) to be sent once every second during a transmission and cause DLE/SYN to be sent during a transparent stop condition. The "transmit and . . . " modes cause accumulated BCC/LRC to be sent and the transmit operation to be terminated. The "transmit terminate" mode can only be ended by a B-STAT Available request.

B-STAT Available Request

The B-STAT Available Request Handler is entered when there is a change in DCE interface signals, an overrun/underrun condition, a time-out on a CCA-timer, or a CCA machine check. There are seven true B-STAT Available requests: B-STAT Available: Enable, Disable, Dial, Receive, transmit initiate, transmit normal/end and transmit terminate.

The B-STAT Available Request Handler can examine the M-STAT registers of the CCA as well as the B-STAT register. It further performs various checking and control functions.

The Synchronous Data Link Control Facility

The Synchronous Data Link Control Facility provides the ICA with the capability to operate its TP lines in SDLC mode. It provides for multipoint control station functions. The ICA can operate as a primary or a secondary station on the SDLC lines; furthermore, the line speeds range from 600 to 64,000 bps for SDLC.

The main part of the SDLC line protocol is executed by the SDLC line controller, thus providing a link between the Channel Service Facility and the functions of the CCA in controlling lines operating in SDLC mode.

For SDLC operations, the main functions of the CCA are:
 (1) Serializing/deserializing a byte;
 (2) Buffering of one data byte (receive and transmit;
 (3) Controlling the attached DCE and sensing DCE conditions;
 (4) Establishing transmit and receive bit timing by using either the business machine clock or DCE timing signals;
 (5) Recognizing flag bytes when not in sync; and
 (6) Providing interval timer functions settable by microcode to times ranging from fractions of milliseconds to a plurality of seconds.

The SDLC Facility has control at the highest trap level. It contains Command Initiation Modules and Request Modules.

The ENABLE, DISABLE and DIAL command initiation handlers are common to all line control operations and reside in the CSF as mentioned previously as well as the SET MODE command handler, which is applicable to SDLC and BSC only.

When a CCA senses an interrupt, the ICA-Bus Adapter fetches the B-Stat from the particular CCA and selects a trap module. The B-Stat gives the cause of the interrupt, which defines the entry point to select in the SDLC Facility. The content of the MODE byte selects the appropriate Request Modules. There are three causes for an interrupt:
 (1) The availability of a byte, normal input request (receive)
 (2) The request for a byte, normal output request (transmit)
 (3) A status change of the CCA that requires the attention of the Line Controller, i.e., "B-Stat Available" request.

The Synchronous Data Link Control command set and line sequences required to communicate with other SDLC stations are described in the publication: *IBM Synchronous Data Link Control Information*. For ICA, two levels of commands are defined, however:
 (1) Basic commands—similar to the corresponding BSC commands: TIC, NOOP, ENABLE, DISABLE, DIAL, SET MODE, SENSE, READ and WRITE. The basic commands are used for the initialization of line interface, termination and error processing.
 (2) High Level Commands—providing a higher level of control for polling operation and during I-frame transfers.

Information related to each station is passed from the access method to the line interface with a "station Control Block" (SCB). Each SCB contains fields with the station's SDLC address, Ns and Nr counts and station status flags. With this information, the line interface builds a SDLC poll and interprets its response. A table of SCBs forms an autopoll list which can be cycled repeatedly under channel program control until a poll is successful. The ICA can thus absorb all overhead due to negative polling.

The ICA will in addition build the frames to be transmitted and check the frames received. The current SCB is again used as the source for address and counts information. Only the information field, which forms a "Path Information Unit" (PIU), is transferred across the channel interface. A series of PIUs for one station can be transmitted and received without intermediate access method intervention.

Station Control Block

The high level commands provide the line attachment with the capability to repeatedly poll all stations for outstanding messages or for initial contact. It can also handle the A- and C-fields of SDLC frames transmitted or received. While each station is being serviced, specific information about this station is required in the line attachment. This information is contained in its Station Control Block (SCB), the format of description of which can be found in Table 3.

The AUTOPOLL, CONTACTPOLL, CONTROL-SCB, READ-PIU, WRITE-PIU, POLL, and SENSE SCB commands require one or more SCBs for execution. The AUTOPOLL and CONTACTPOLL commands point at a continuous table of SCBs which are sequentially fetched during polling. The CONTROL-SCB command is used to transfer one specific SCB to the line attachment. The READ PIU, WRITE PIU and POLL commands must be preceded by AUTOPOLL or CONTROL-SCB so that one SCB, the "current" SCB, is available in the line attachment. The current SCB is retrieved by the access method with a Sense SCB command. A new SCB must be transferred to the line attachment in order to initialize the current SCB again.

As shown in Table 3, each SCB contains 24 bytes. Sixteen of these are transferred from the access method to the line attachment with the AUTOPOLL, CONTACTPOLL or CONTROL-SCB commands. The SENSE-SCB command returns all 24 bytes. The extra bytes reflect the outcome of the channel program executed with respect to the number of data buffers used and any exceptional condition; hence, they are only transferred from the line attachment to the access method with the SENSE-SCB command, and are never transferred from the line attachment in the other direction.

All SCB fields that are transferred from the access method to the line attachment are initialized by the access method. The station address, buffer offset and control flag and identification fields are never altered by the line attachment. The frames-sent and acknowledgement count, receive-buffers-used count, command received, exception flags, and sense information fields are updated by the line attachment.

TABLE 3

SCB FORMAT AND DESCRIPTION

| Byte | Description |
|---|---|
| 0 | SDLC station address, ADDRESS. The ICA uses the address field when building outbound I-Frames or poll frames. Inbound, the address field of frames received in response to poll are checked against ADDRESS. In case of a mismatch, Unit Check is set if the ICA is running as primary; the frame is ignored if running as secondary. |
| 1 | Buffer offset, OFFSET. When data is transferred to main storage during the execution of a READ-PIU command, then this offset value is used to determine the starting point at which the data is stored. Similarly, during a WRITE-PIU the data is transferred from main storage starting from an address, which is formed using the offset value. The offset may have any value in the range 2 through 255. If during a READ-PIU command, data is received which is not an I-frame, the starting address for data in the buffer is determined with the use of the OFFSET field. |
| 2 | Reserved field, must be zero. |
| 3 | Control flags, CTLFLAGS. Bit definitions: |
| 0 | SKIP: 1 = Inactive station, do not poll at all. 0 = Active station, perform polling. |
| 1 | AUTOP: 1 = Autopoll this station during AUTOPOLL commands. 0 = Contactpoll this station during CONTACTPOLL commands. |
| 2 | SLOWOUT: 1 = Send "RNR" poll. 0 = Send "RR" poll. This bit is also defined as a global value for the SDLC-ICA using the "SET-MODE" command in any subchannel with SDLC operation. A logical OR is formed between the global bit and the SLOWOUT bit. The result being one indicates a slowout condition. Therefore, when slowdown mode has been set via the SET-MODE command "RNR" polls are sent regardless of the SCB contents. |
| 3 | SLOWIN: 1 = "RNR" reply expected to poll. 0 = "RR" reply expected to poll. Whenever the expected reply is received from a station, the Autopoll operation continues. It terminates with the channel end, device end, and status modifier bits set to one when an unexpected reply is received. |
| 4–7 | Reserved, must be zeros. |
| 4 | Current SDLC number of sent I-frame, NSCUR. This field contains the SDLC number (modulo 8 number) of the next I-frame to be sent. It is set into the I-frame control field during WRITE-PIU commands. NSCUR is incremented by one modulo 8 after each I-frame transmitted. If NSCUR becomes equal to NSACK, this indicates that outstanding I-frames must be acknowledged before any more I-frames may be sent. Any further WRITE-PIU command is therefore terminated with command reject, unit check condition. |
| 5 | SDLC Number of sent I-frame acknowledged, NSACK. This field contains the SDLC number (modulo 8 number) of the latest sent I-frame, which is acknowledged by the remote station. Whenever a response containing a Nr field is received from a station the line attachment uses it to update NSACK. The absolute difference is also set into the CFRS field. If the received Nr is outside the range from NSACK to NSCUR (modulo 8), Unit Check is stacked with sense information indicating an unexpected Nr field. (The control byte received is set into the CMDIN field of the SCB). |
| 6 | SDLC number of next I-frame to be received, NRACC. This field contains the SDLC number plus one (modulo 8) of the last valid I-frame received. The line attachment sets the contents of this field into the Nr part of the SDLC control field during polling and I-frame transmission. The NRACC field is also used when valid I-frames are received. The line attachment compares the received Ns field with the contents of NRACC. The I-frame is accepted if they are equal. The NRACC field is then incremented by one modulo 8. If an invalid frame is received, NRACC will be frozen and no more I-frames will be accepted until after a valid frame with the poll/final bit equal to one has been received or a timeout has occurred, whichever comes first. If the received Ns does not correspond with the NRACC value and the ICA is not skipping invalid frames, then Unit Check is stacked with sense information indicating that received I-frames were out of order. CMDIN will now contain the control field from the erroneous frame. (The channel program is not terminated, however, until a valid frame with the poll/final bit equal to one is received or a timeout occurs). |
| 7–11 | Reserved field; must be zeros. |
| 12–15 | Identification field, IDENT. This field is used by the access method to identify each SCB-entry. It is passed without any change between the access method and the line attachment. |
| 16 | Count of frames sent and acknowledged, CFRS. This is a zero based field. When the line attachment changes NSACK based on a newly received Nr, the absolute difference is accumulated into the CFRS-field. The contents of this field are used by the access method to release the appropriate WRITE-PIU buffers containing the frames acknowledged. If CFRS is not equal to the number of frames actually transmitted, the station missed some. The access method must back NSCUR to NSACK and modify the channel program accordingly to retransmit the frames lost. |
| 17 | Count of receive buffers used, CRBUF. The line attachment of productive READ-PIU commands executed during the channel program, i.e., READ-PIU commands with actual data transfer of valid frames. This field can be used by the access method to determine the number of unused buffers to be released. |
| 18 | Command Received, CMDIN. If the frame received does not contain the control byte expected, as defined in the flags field, this field is stored in the CMDIN field for further examination by the access method. |
| 19 | Exception flags, EXCFLAGS. This field contains information about exceptional conditions which occurred during the execution of the previous channel program. It is interrogated by the access method. Bit definitions: |
| 0 | Read Error Indicator This bit is set to one if any received frame was invalid, i.e., had BCC-check or a timeout occurred, during the execution of READ-PIU commands. It is used by the access method to update error counts. |
| 1 | Last frame contains non-sequenced information. This bit is set to one if non-sequenced information was received during this channel program. The information is set into the last receive buffer used so that the access method can interrogate. |
| 2 | Remote station transition occurred. This bit is set to one if RNR was received from the remote station, when the CTLFLAGS field indicates that the station is expected to send RR or vice versa. |

TABLE 3-continued

SCB FORMAT AND DESCRIPTION

| Byte | Description |
|---|---|
| 3 | CMDIN field used. This bit is set to one when an SDLC command is set into the CMDIN field. This occurs when any unexpected command is received, or when the SDLC numbers do not match with expected values. |
| 4 | Contactpoll operation was performed. This bit is set to one when the channel program terminated due to a Contactpoll operation, that resulted in a positive reply. |
| 20–22 | Sense informtion, SENSE. This field contains the same sense information as provided with the normal SENSE command. |
| 23 | Reserved field. |

The following describes the seven High-level commands:

The AUTOPOLL command provides a means of requesting several remote stations, one after the other, to transmit data to the line attachment. The command is normally used in a multipoint network (where several secondary stations are connected to the same receive line) but it can also be used in a point-to-point installation. In addition, it is used when the ICA serves as a secondary station.

AUTOPOLL will only be accepted if the line is enabled and the line is in outbound direction. Otherwise the channel program will be terminated immediately with a command reject unit check condition. The line status is not changed.

The AUTOPOLL command points at a table of SCB's, one for each station on the line. The line attachment initially fetches the SCB indicated by the autopoll index making it the current SCB. This is done in the following way: The index value is shifted left four positions. The result forms a displacement into the SCB-table. If this displacement points outside the SCB-table, then the index value is reset to zero making the first SCB-entry the current.

If the SCB flags indicate that the station is inactive or a Contactpoll operation is requested, the line attachment updates the Autopoll index by one and fetches the next SCB. If the flags indicate Autopolling for this station, then a poll frame is sent.

The address and command fields are constructed using the information in the current SCB. The P/F (poll/final) bit is always set. The polling message is transmitted.

The line attachment then goes into receive mode. Further actions by the line attachment depend on the reply of the remote station, as described in the following text. The received replay may be one of the following:

(a) RR (Receive Ready) or RNR (Receive Not Ready) received exactly as specified in the SCB. This indicates that the remote station has nothing to send and has not changed its mode between slowdown and normal data transfer mode. The line attachment updates the Autopoll index by one and repeats the same actions as described above, until the whole SCB-table has been exhausted.

(b) Unexpected command, such as RR received when RNR was expected; or RNR received when RR was expected; or RR or RNR as expected received but the N(S) and N(R) values different from the corresponding fields of the current SCB, or another command including I-frame and non-sequenced frame; or frames with wrong address (primary mode only), invalid frames, frames which terminate with an ABORT sequence.

The command is terminated with CE, DE, SM normally causing a transfer in the channel program to a READ-PIU or SENSE-SCB which will process the incoming frame.

The Autopoll Index is not updated when status modifier is presented. If, therefore, I-frames have been received from a remote station, this station will be the first one polled the next time the autopoll operation is resumed. This is normally the correct mode of operation but the access method may turn to another station using the SET-MODE command to change the autopoll index.

When the autopoll index returns to the value it had at the beginning of the autopoll operation one complete scan has been made. The command is terminated with channel end, device end status. The line remains in outbound direction.

If a stacked unit check condition is encountered during the initialization phase the command is terminated immediately with status modifier set.

If the line cannot be serviced in time by the ICA, an overrun unit check condition is stacked and the command is terminated with status modifier. If this happens during outbound transmission, the frame is terminated with the ABORT sequence. The line stays in outbound direction if working in primary mode. In secondary mode the line is turned into inbound direction. All subsequent line affecting commands in the same channel program are treated as NOOP'S.

The CONTACTPOLL command is used by primary stations to invite disconnected stations to enter normal response mode. The stations are specified in a table of SCB's. The same table as the one used for Autopoll can be used. Flag bits in the SCB indicate whether a station is disconnected and should be contactpolled or in normal response mode (NRM) for Autopoll operation.

There are two tuning parameters for contactpoll operations: a frequency counter, which determines how frequent the stations should be contactpolled when they are found in the table of SCB's, and a service seeking pause, which defines a time to delay command termination during low traffic periods in order to reduce processor interference due to nonproductive polling. Both parameters can be changed with the SET MODE command.

A contactpoll index per line attachment is used to point at the next SCB to be interrogated. This index is normally maintained by the line attachment but may also be changed with the SET MODE command.

CONTACTPOLL will only be accepted if the line is enabled, the line is in outbound direction and the line operates in primary mode. Otherwise, the channel program will be terminated immediately with a command reject unit check condition. The line status is not changed.

When the CONTACTPOLL command is executed, the line attachment fetches one SCB, using the contactpoll index, as follows: the index value is shifted left four positions. The result forms a displacement into the SCB-table. If this displacement points outside the SCB-table, then the index value is reset to zero, making the first SCB-entry current. The frequency counter is decremented by one each time a CONTACTPOLL command is executed until it reaches zero. The SCB-flags are inspected, and if they indicate that the station is to be contactpolled, a contactpoll operation is performed, as described below, if the counter is at zero. If the counter is not zero, the CONTACTPOLL command is terminated without updating the contactpoll index when the service seeking pause has elapsed.

If the SCB-flags indicate that the station is not to be contactpolled, then the index value will be incremented by one and the command terminated with channel end, device end. If, however, the frequency counter has reached zero, then the line attachment will scan the SCB-table until it finds an entry to be contactpolled or a complete scan of the table has been made, whichever occurs first. A contactpoll operation is performed if possible. No service seeking pause is made in this case.

A Contactpoll operation proceeds as follows:

A transmitted "SNRM" frame is transmitted with the stations address of the current SCB and the P bit on. The line attachment then goes into receive mode. The idle detect timer is started. The received reply may be one of the following:

(a) No reply (or ROL): If the remote station is inactive, the idle timer elapses in the line attachment. This is the normal situation. The CONTACTPOLL command now ends with channel end, device end. The contactpoll index is updated with one.

(b) Reply: If any frame is replied the command terminates with CE, DE, SM. This causes normally a transfer in the channel program to a READ PIU or SENSE SCB which will process the incoming frame.

If the line cannot be serviced in time by the ICA an overrun unit check condition is stacked and the command is terminated. If this happens during an outbound operation the transmission of the frame is terminated with the ABORT sequence. The line stays in outbound direction when operated in primary mode. Otherwise the line is turned into inbound direction. Subsequent line affecting commands in the same channel program are treated as NOOP's.

3. The POLL command is used after a chain of WRITE-PIU commands to transmit a final "RR" or "RNR" (depending on the state of the line attachment) poll command. The poll/final bit is set to one; it is never set to one in any I-frames transmitted via WRITE PIU. All information required is taken from the current SCB. The line is turned to the inbound direction when this command has been executed.

The POLL command is valid only if the line is enabled, the line is in the outbound direction and an SCB was passed to the line attachment in the current channel program. The channel program will otherwise be terminated immediately with a command reject unit check condition, without changing the line status.

If the line cannot be serviced in time by the ICA an overrun unit check condition is stacked and the command terminated. The transmission of the frame is terminated with the ABORT sequence. The line stays in the outbound direction if operating in primary mode. Otherwise, the line is turned into the inbound direction. Subsequent line affecting commands in the same channel program are treated as NOOP's.

4. The READ-PIU command is used to transfer the Path Information unit of an incoming I-frame and the length of it into main storage.

The READ-PIU will only be accepted if the line is enabled, the line is in the inbound direction, and an SCB was passed to the ICA in the current channel program. The channel program will otherwise be terminated immediately with a command reject unit check condition. The line status is not changed.

A READ-PIU operation proceeds as follows: when a valid I-frame is received, the I-field is transferred to main storage. The starting address is the command data address plus the offset field of the current SCB. The data transfer continues until the terminating flag is found or the storage area is exhausted. The Block Check Characters are not transferred. If the storage area is exhausted, it is tested whether data scanning was specified, and if so, the chained READ PIU specifies the next data area to continue the data transfer and the CRBUF field of the current SCB is bumped. Otherwise, the frame is read up to the ending flag without further data transfer. In any case the total length of the frame is stored into the first two bytes of the first buffer. The READERR bit in the exception flag of the current SCB is reset. The Nr count of the frame received is used to update the NSACK and CFRS fields of the SCB. If the total frame was transferred into main storage, the CRBUF and NRACC fields of the current SCB are bumped. The command is ended with CE, DE.

When valid non-sequenced frames are received, the command field is stored into the CMDIN field of the current SCB and the CIUSE bit in the exception flag byte of the current SCB is set. If the frame has an I-field, this is treated the same way as an I-field of an I-frame. Data spanning applies and the length field is stored into the first buffer. The LRNSI bit in the exception flag byte of the current SCB is set. After one non-sequenced frame has been received, all further inbound data is ignored except for P/F bit, and subsequent line affecting commands in the same channel program are treated as NOOP'S.

When valid Supervisory Frames are received, the Nr count is used to update the NSACK field of the current SCB. If an RR was expected and an RNR received or vice versa, the STRANS bit in the exception flag byte of the current SCB is set. The command field is stored into the CMDIN field of the current SCB and the CIUSE bit in the exception flag byte of the current SCB is set. After one supervisory frame has been received, additional inbound data is ignored except for a P/F bit. Subsequent line affecting commands in the same channel program are treated as NOOP's.

When a P/F bit has been received the line is turned around into the outbound direction. Subsequent line affecting commands in the same channel program are treated as NOOP's.

The address field of the incoming frame is compared with the address in the current SCB. If the address does not match, the action depends on the line mode. If the ICA is acting as a primary SDLC station, unit check is stacked and the command terminated. The received address will be returned to the access method in a third sense byte. All following line affecting commands in the same channel program are treated as NOOP's. If the ICA is acting as a secondary station, the frame is ignored. The line attachment starts searching for a new frame. The command remains active.

If the N(S) field is out of sequence (the NRACC field of the SCB does not match the N(S) field) or if the Nr field is out of sequence (the Nr is not between the NSCUR and NSACK values) or if the CRBUF field of the SCB reaches 64, a unit check is stacked, the command is terminated and all following line affecting commands in the same channel program are treated as NOOP's.

If the FSC bytes indicate an invalid frame or if the frame is too short, the READERR bit in the exception flag of the current SCB is set. Subsequent line affecting commands in the same channel program are treated as NOOP's.

If a frame is terminated with an ABORT sequence, the READ PIU is terminated and all following line affecting commands in the same channel program are treated as NOOP's.

If the line cannot be serviced in time by the ICA, a unit check overrun condition is stacked and all following line affecting commands in the same channel program are treated as NOOP's.

5. The WRITE-PIU command is used to transmit an I-frame. The address and command fields are generated by the line attachment using the current SCB. A CONTROL-SCB command should therefore precede the first WRITE-PIU command in the channel program to transfer the appropriate SCB.

The WRITE-PIU command is symmetrical with respect to the READ-PIU command: the length of the PIU is transferred as the first two bytes of the buffer area and the OFFSET field of the SCB is added to the data address field of the WRITE-PIU command to form the starting address of the PIU to be transmitted.

The command will only be accepted if the line is enabled, the line is in outbound direction and an SCB was passed to the ICA in the current channel program. The channel program will otherwise be terminated immediately with a command reject unit check condition. The line status is not changed.

A WRITE-PIU operation proceeds as follows: A total I-frame is transmitted. The address byte is taken from the current SCB. The command field is constructed using NSCUR and NRACC from the current SCB for N(S) and N(R) respectively. The P/F bit is always set to zero. The I-field is transferred from main storage. The starting address is the command data address plus the OFFSET field of the current SCB. The I-field length is specified in the first two bytes of the data area.

If data spanning is specified the I-field may extend over more than one data area. Consecutive data areas are specified in chained WRITE PIU commands. Data is taken from the start of those succeeding areas, the offset scheme is not used. The length given in the first data area still applies.

The FSC characters accumulated by the ICA and trailing flags are sent out after the I-field. The NSCUR field of the current SCB is updated. And, the outbound direction of the line is maintained.

If during transmission the data counts is exhausted, the frame length specified further I-field bytes and data spanning is not specified. A unit check command reject condition is raised and the channel program is terminated. The transmission of the frame is terminated with the ABORT sequence. The line stays in the outbound direction, if working in primary mode, otherwise, the line is turned into the inbound direction.

If the line cannot be serviced in time by the ICA, an overrun unit check condition is stacked and the command terminated. The transmission of the frame is terminated with the ABORT sequence. The line stays in the outbound direction if working in primary mode, otherwise, the line is turned to the inbound direction.

All following line affecting commands in the same channel program are treated as NOOP's.

If too may frames were sent without being acknowledged, a further WRITE-PIU will raise a unit check command reject condition and the channel program is terminated immediately.

6. The CONTROL-SCB command is used to transfer a specific SCB to the line attachment. It ordinarily precedes a WRITE-PIU or a chain of WRITE-PIU commands, giving the line attachment the information necessary to build outbound I-frames. The line attachment must be enabled before a CONTRO-SCB command is accepted or a unit check termination occurs with the sense byte indicating command reject. Sixteen data bytes are transferred with the CONTROL-SCB command to form the current SCB. They are checked for validity: the OFFSET field must be greater than 2 and the reserved fields must be zero.

7. SENSE-SCB is used to retrieve the current SCB after a line I/O operation is completed (normally or abnormally). Twenty-four bytes are plus transferred. They contain error and unusual condition indications plus updates to the frame and Ns/Nr counts. Since the I/O operation may have started as a result of an autopoll or contactpoll operation, the current SCB has the only indication as to which station responded. The access method will transfer appropriate fields to its copy before restarting the channel program.

If the line is in the inbound direction, the SENSE-SCB command will also function as a READ-PIU command, that no incoming I-field is transferred into main storage. With this subfunction, the SENSE-SCB is a line affecting command.

The following are examples of channel programs using the channel commands. The examples that follow are, however, valid sequences to illustrate the operation.

EXAMPLE I

Primary station on a multipoint line during normal operation

| Channel Program | | | |
|---|---|---|---|
| START: | NOP[1] | XMIT: | CONTROL SCB[1, 6] |
| | NOP[1] (TIC TO XMIT) | | WRITE-PIU[1] |
| | AUTOPOLL[1, 3] | | WRITE PIU[1] |
| | TIC TO CPOLL | | WRITE PIU[1] |
| RECV: | READ-PIU[1] | | POLL[1, 7] |
| | READ-PIU[1] | | TIC to RECV[8] |
| | READ-PIU[1] | | |
| | SENSE-SCB[4] | | |
| CPOLL: | CONTACTPOLL[1, 3] | | |
| | TIC to START | | |
| | SENSE-SCB5 | | |

The superscripts refer to the following by number.
1. Command Chained.
2. This NOP is changed to a TIC to the XMIT path when there are frames ready to be sent.
3. AUTOPOLL and CONTACTPOLL point to a table of SCB's. The SCB fields indicate what kind of poll to send to each station and what response to be expected. If the response is not as expected. Status Modifier is set causing the TIC to be skipped.
4. This SNESE-SCB transfers the current SCB to main storage. It shows: what station responded to the AUTOPOLL, how many frames were received, whether any errors occurred, and, if the RECV path followed, XMIT, how many frames were successfully -continued

| Channel Program |
|---|
| sent. |
| 5. SENSE-SCB to find out which station responded to SNRM. |
| 6. CONTROL-SCB provides a new current SCB. It indicates for the line attachment: where to send the data and what N(S)/N(R) values to put in the I-frame control field. |
| 7. The station is polled to find out how many of the frames just sent were successfully received. |
| 8. The XMIT path TIC's to the RECV path to get the response to the outbound frames - the response may be in an I-frame |

EXAMPLE II

Secondary station during initialization and normal operation

| Channel Program | | |
|---|---|---|
| INIT: | SETMODE[1,2] | NORMAL: NOP[1] |
| | ENABLE[1] | NOP[1] (TIC to XMIT) |
| | READ[3] | AUTOPOLL[1,6] |
| | | TIC to NORMAL |
| INTA: | CONTROL SCB[1,4] | RECV: READ-PIU[1] |
| | WRITE[1,5] | READ-PIU[1] |
| | TIC to RECV | READ-PIU[1] |
| | | SENSE-SCB |
| | XMIT: | CONTROL-SCB[1] |
| | | WRITE-PIU[1] |
| | | WRITE-PIU[1] |
| | | WRITE-PIU[1] |
| | | SEND-POLL[1] |
| | | TIC to RECV |

The superscripts refer to the following by number.
1. Command Chained.
2. A flag in the SETMODE parameters indicates that the line is to be operated as a secondary. Furthermore, the address is passed which is used in the READ as station address.
3. READ will not complete until the primary sends a frame, normally a contact poll frame (SNRM) with the address from the preceding SETMODE command.
4. A new channel program is started aafter a SNRM was received (to be checked by the access method).
The station address in the SCB will be the expected address for all subsequent inbound data.
5. WRITE will send an NSA in response to the SNRM.
6. This AUTOPOLL is not really polling. A SIO is issued to this channel program after a poll has been received so the frame sent by AUTOPOLL is a response to poll.

EXAMPLE III

Primary station initialization on a switched autocall line

| Channel Program | | |
|---|---|---|
| CONNECT: | DISABLE[1,2] | NORMAL: ...[6] |
| | DIAL[1,3] | |
| | WRITE[1,4] | |
| | READ[4] | |
| CONTACT: | WRITE[1,5] | |
| | READ[5] | |

The superscripts refer to the following by number.
1. Command Chained.
2. The DISABLE will protect against a race condition if a previous ENABLE for an incoming call was halted.
3. DIAL sends the dial digits to the autocall unit associated with this line. It also implies ENABLE.
4. The first WRITE/READ sequence sends the XID -continued

| Channel Program |
|---|
| request and reads the terminal ID in the XID response. The ID information is used to build a SNRM and find/build the SCB for the station. |
| 5. WRITE/READ can be used to send SNRM and read NSA. |
| 6. From this point on, operation is the same as for leased lines. The SCB table for this line will have only one entry since switched implies point to point. |

EXAMPLE IV

Primary station error recovery in multipoint operation

Error recovery involves retransmitting non-acknowledged I-frames sent or repolling for bad frames received. Retriable errors are detected by the line attachment but the retries themselves are initiated by the access method. No new channel programs are necessary to perform retries.

The first bad I-frame received stops the transfer of data into the buffers. The NRACC and NBFRR fields are frozen and the NRETRY counter is incremented by one. The READ-PIU command is terminated normally when a frame is correctly received having the P/F-bit sent to one or when a time-out occurs. The time-out in this situation is handled as a retriable condition because the P/F bit may have been missed in a bad frame. Note also that the line attachment continues to look at frames and check block check characters even though no data transfer takes place.

The channel program ends with a SENSE-SCB command. The access method determines that an error has occurred. At this point, everything is set up properly for repolling the station to get the missed frames. The SCB must be updated with fields from the ICA's copy and the channel program restarted. The autopoll index still points at the SCB last used and NRACC only acknowledges the good frames received. Before restarting however, the access method determines whether a retry limit has been exceeded or whether some other station should be serviced.

For outbound frames, acknowledgement is found in the N(R) field of the next RR, RNR, or I-Frame received from the station. The access method finds out that an error has occurred by comparing the number sent with the number acknowledged and finding a mismatch. To retry, the number sent is reset to the number acknowledged and the WRITE-PIU's are started from the first frame missed. In this case, the access must maintain its own retry count.

The Diagnostic Facility

The ICC microcode in the host CPU further includes a Diagnostic Facility 49 which in addition to the usual diagnostic tools, provides for dynamically displaying diagnostic and test information about one of the ICA lines on the host system's Console Display. The display information is updated continuously, other line operations are not impacted, and the CPU is not abnormally loaded.

Test frames can be transmitted and received using the Diagnostic Facility, thus providing for verifying the operation of the ICA, including the connection to remote stations as well as the ICC. As a primary station, the SDLC test frame can be transmitted by specifying a transmit function. The A-, C-, and I-fields are specified as data for this function. The response can be displayed. As a secondary station, the SDLC address to monitor is specified as data with "Monitor for test" and "Echo" functions. If a test command is received and these functions are active, it is transmitted back.

These functions are activated when the line is disabled. When line testing is in progress, all channel programs on the line are terminated during initial selection with unit check, command reject and the sense byte indicating the exact cause of the rejection. No indication is given on the channel interface when the testing has terminated.

Hence, this dynamic facility can even be used when there is no software package run on the system. Furhtermore, it can be used on all lines or terminals regardless of type.

The ICA Diagnostic Facility utilizes the ICA timer in the Bus Adapter timer which can trap to the host CPU on the highest level after 13 ms. At predetermined time intervals, control can be passed to the Diagnostic Facility module in the host CPU's control store, which then senses CCA requests for the line in question. The sensed information together with some of the information in the line's UCW are then formatted and displayed on the console display. The displayed information is:

(1) the active command in coded form;
(2) the sense information;
(3) the data byte currently transmitted on the TP line;
(4) MSTAT register bits—Data Set Ready, Clear to Send, Carrier Detect, Ring Indicator;
(5) MCTRL register bits—Data Terminal Ready, Request to Send;
(6) ACTRL register bits—Receive Mode, Transmit Mode; and
(7) SDLC operation, specific SDLC fields such as the Nr and Ns fields.

The Diagnostic Facility microcode is executed in the CPU on the highest level. In order not to interfere with the BA operations, it uses this level for very short periods of time, each time it is given control. Thus, the risk for over-and under-runs on I/O units using lower trap levels is minimized. Furthermore, the highest trap level is used only a very small fraction of the test duration, thus minimizing the general impact on the rest of the system.

Inline testing is facilitated as follows. First, the test is initiated by the microcode on the lowest level, which starts the ICA timer. Then, each time the timer trap occurs, the Diagnostic Facility on the highest level performs one portion of the inline test, updates a state counter, restarts the ICA timer and exits the trap level. The particular portion of the test performed is determined by the value of the state counter. Eventually, the state counter reaches an end value at which the ICA timer is not restarted, but the test result is saved for presentation and a termination routine on the lowest level is invoked. By limiting the test portions to about 10 microseconds, the fraction of the time used by the test is kept below 1/1000 while the total run time for the test remains reasonable.

Having thus described the invention, what is desired to be protected by Letters Patent is:

1. In a data processing system having a central processing unit with main control storage and local storage, a high speed bus connected to said central processing unit and a plurality of high speed adapters connected to said high speed bus, at least one of said high speed adapters being a bus adapter, an integrated communication controller comprising communication control microcode resident in said main control storage for performing communication line control functions using said high speed bus.

2. A system as defined in claim 1 further including a plurality of low speed adapters connected to said high speed bus adapter through a low speed bus and serving communication lines having different transmission speeds and characteristics.

3. A system according to claim 2, wherein the communication control storage further comprises start/stop line control storage, binary synchronous line control storage and synchronous data link line control storage.

4. A system according to claim 1 wherein the main control storage includes microcode storage comprising an interrupt handler handling interrupt conditions for all high-speed adapters in the system and an input/output instruction handler handling input/output instructions related to the high-speed adapters.

5. A system according to claim 4 wherein the communication control storage includes channel service storage comprising microcode for controlling the interaction between communication line control and input/output control.

6. A system according to claim 2 wherein the high-speed bus adapter comprises an operation register for controlling the operation mode of the low-speed bus and the low-speed adapter, said register having a plurality of latches settable by control commands and readable by sense commands from the communication control storage.

7. A system according to claim 6 wherein the high-speed bus adapter comprises a data register for data transfer between the high-speed bus and the low-speed bus, an address register for storing low-speed adapter addresses, a command register for controlling the operation of the low-speed adapters and a status register for storing the operation status of the line adapters.

8. A system according to claim 7 wherein the high-speed bus adapter operates in one of three modes: an idle mode, an interrupt response mode wherein the high-speed bus adapter handles interrupts coming from low-speed adapters, and a microcode control mode wherein the high-speed adapter acts as a slave to the microcode in the communication control storage.

9. A system according to claim 2 wherein at least one low speed adapter is connected in a full duplex multipoint configuration to a number of substations for synchronous data transmission.

10. A system according to claim 9 having a number of line control words, one for each communication line, and a number of station control words, one for each substation in the local store whereby the station control words are selectively transferred by microcode commands from the local store to the high speed adapter and back to the local store.

11. A system according to claim 10 having a first table of station control words in local storage related to a first group of stations on a line to be polled continuously, and a second table of station control words in local store related to a second group of stations on a line to be polled selectively.

12. A system according to claim 10, wherein each station control word comprises a frame counting field to be incremented and decremented in the high speed adapter by information frames sent and received on the communication line.

* * * * *